United States Patent [19]

Kaneyuki

[11] Patent Number: 4,643,046
[45] Date of Patent: Feb. 17, 1987

[54] ACCESSORY DRIVE DEVICE IN ENGINE
[75] Inventor: Kazutoshi Kaneyuki, Hyogo, Japan
[73] Assignee: Mitsubishi Denki Kabushiki Kaisha, Tokyo, Japan
[21] Appl. No.: 802,998
[22] Filed: Nov. 29, 1985
[30] Foreign Application Priority Data Nov. 30, 1984 [JP] Japan .......................... 59-182906[U]

[51] Int. Cl.⁴ ...................... F16H 17/06; F16H 15/50; F16H 15/60
[52] U.S. Cl. .................................. 74/752 C; 74/192; 74/796
[58] Field of Search ...................... 74/191, 192, 752 C, 74/752 B, 796

[56] References Cited
U.S. PATENT DOCUMENTS 2,953,039  9/1960  McRae ............................... 74/796 X
3,108,496 10/1963  Kashihara ............................ 74/796
3,108,497 10/1963  Kashihara ............................ 74/796
4,232,561 11/1980  Kashihara et al. ................ 74/796 X
4,468,984  9/1984  Castelli et al. ................... 74/191 X

FOREIGN PATENT DOCUMENTS 58-86434   6/1983  Japan .
58-200838 11/1983  Japan .
59-22345   2/1984  Japan .
59-86455   6/1984  Japan .

Primary Examiner—Allan D. Herrmann
Attorney, Agent, or Firm—Bernard, Rothwell & Brown

[57] ABSTRACT

A device which drives accessories such as an alternator or a cooling water pump utilizing output of an automobile engine, includes an input shaft installed to an output shaft of the engine, a nonstage transmission installed between the shaft and a pulley connected to the accessory, and a one-way clutch to allow the whole device to rotate in the same direction and at the same speed as that of the input shaft if the input shaft and the pulley are directly coupled due to fault of the nonstage transmission.

6 Claims, 4 Drawing Figures

CENTER OF ROTATION

ACCESSORY DRIVE DEVICE IN ENGINE

BACKGROUND OF THE INVENTION

1. Field of the Invention

The present invention relates to a device for driving various accessories such as an alternator, a cooling water pump or the like, utilizing power of an engine of an automobile or the like.

2. Description of the Prior Art

In an engine of an automobile or the like, accessories such as an alternator, a cooling water pump, an air-conditioning compressor, an oil pump for hydraulic servo steering or the like are belt-driven by a crank pulley intalled at an end of a crank shaft. Since the accessory drive is accompanied with large power loss during the high speed running of the engine, in order to avoid it, various methods have been proposed that gear shifting of a crank pulley is performed with respect to the engine rotational speed and the running speed of the accessory is limited.

For example, Japanese patent application laid-open No. 200838/1983 discloses technology that a reduction drive system comprising a planetary reduction gear and a one-directional clutch, and a direct-coupled drive system comprising a lock-up clutch composed of a hydraulic piston are constituted between a crank shaft and a crank pulley of an engine, thereby the rotational speed of the crank pulley is selectively changed at two stages with respect to the engine rotational speed. In the prior art, however, since rapid speed variation is produced at the speed changing state, variation of the driving force of the accessory applies a variation shock to the vehicle driving force of the engine, thereby the running stability of the vehicle is deteriorated resulting in unpleasantness to the driver. Moreover, there are problems in durability of the planetary reduction gear, potentially resulting in noise. Consequently, this method is not practicable.

On the other hand, for example, Japanese utility model application laid-open No. 86434/1983 discloses technology utilizing a variable pitch pulley to vary effective pitch diameter, wherein a driving pulley of variable pitch is installed on a crank shaft, and a driven pulley also with variable pitch follows the driving pulley and integrally connects an accessory drive pulley. A movable sheave of the driven pulley is controlled by a hydraulic cylinder so as to control the accessory drive speed.

In this example of the prior art, the high hydraulic source is required to control the movable sheave of the drive pulley, and structure of the hydraulic actuator is considerably complicated. Further a comparatively wide installation space projecting in the crank axial direction of the engine is required. Consequently, this method is not suitable for a front wheel drive car with the engine laterally installed which is commonly used, because there is insufficient space for installation.

SUMMARY OF THE INVENTION

In order to eliminate above-mentioned disadvantages of the accessory drive device in the prior art significantly, an object of the invention is to provide an accessory drive device in an engine, wherein in case of fault such as seizure, drive of the accessory can be continued without breaking the device itself or other element.

An accessory drive device of an engine according to the invention includes a nonstage transmission with a differential planetary mechanism interposed in a transmission system from an input shaft to a pulley for driving the accessory, and a stationary plate to fixedly support an orbit ring, being a stationary element of the nonstage transmission, is connected to a stationary member of the engine through a one-way clutch so that the orbit ring inhibits the rotation in one rotational direction and does not inhibit it in the reverse rotational direction. In this constitution, the orbit ring as the stationary element of the nonstage transmission with the differential planetary mechanism receives the rotational reaction, which is applied to the engine stationary member in the meshing direction of the one-way clutch. Consequently, there is no problem in normal operation. In case the frictional transmission surface sticks due to a fault such as seizure, the rotational force of the input shaft acts in a reverse direction to the one-way clutch operation during the normal state, thereby the connection of the stationary plate to the engine stationary member is released and the accessory drive pulley rotates integrally with the input shaft so as to maintain the function.

DETAILED DESCRIPTION OF THE PREFERRED EMBODIMENT

An embodiment of the invention will now be described referring to the accompanying drawings.

Figure 1:
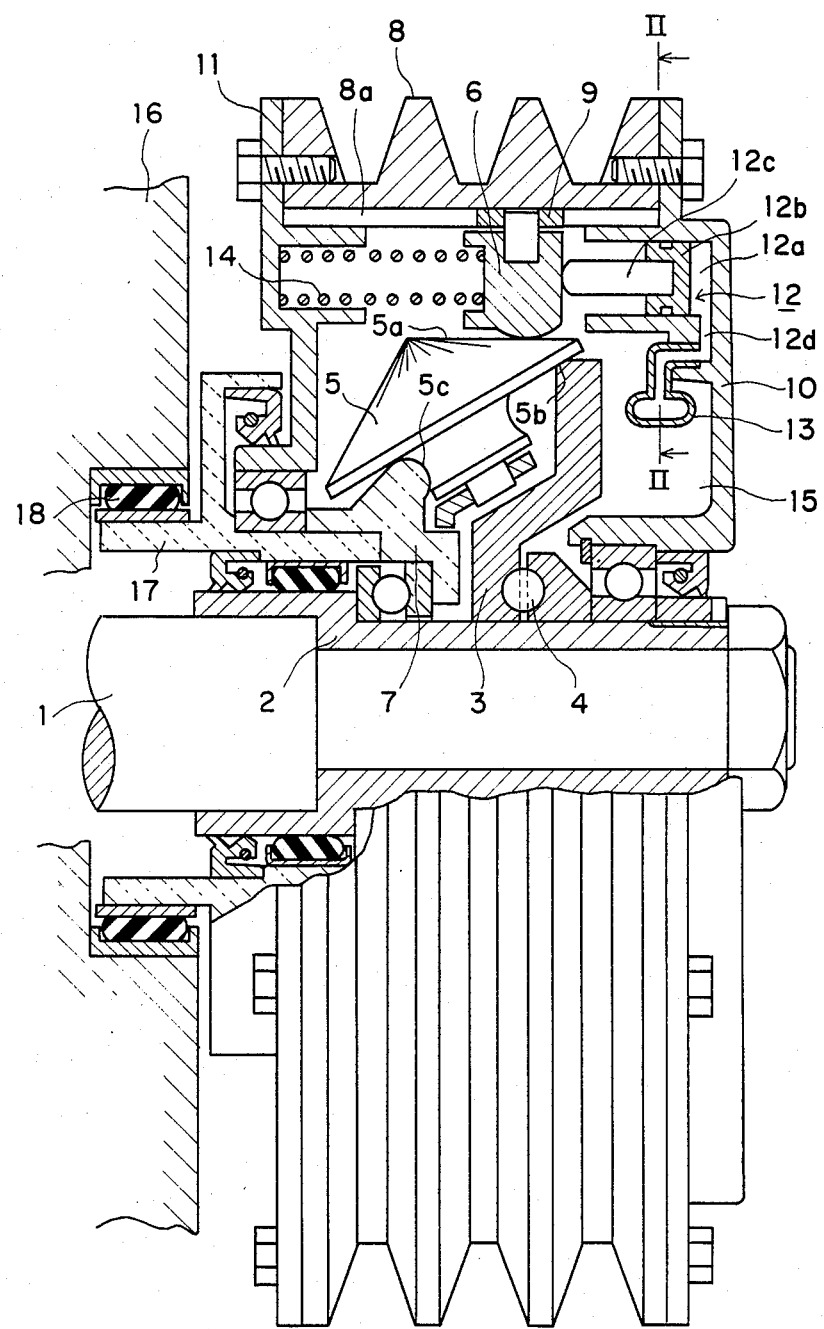
FIG. 1 is a side view of an accessory drive device of an engine according to the invention, partly cut away to reveal the inside thereof.

In FIG. 1, reference numeral 2 designates an input shaft directly coupled to an output shaft such as a crank shaft 1 of an engine, numeral 3 an input transmission member supported by the input shaft, and numeral 4 a cam device for generating pressure interposed between the input shaft 2 and the input transmission member 3. Numeral 5 designates a plurality of cone friction wheels or planetary cones, each composed of a frictional transmission surface $5a$ on a conical surface, a frictional transmission surface $5b$ on a bottom surface of the cone, and a frictional transmission surface $5c$ on a circumferential surface of a shaft leading to the bottom surface of the cone. Numeral 6 designates a shifting ring which is engaged in frictional engagement with the frictional transmission surface $5a$ of the planetary cone 5 and moved in the axial direction so as to vary the frictional transmission radius of the planetary cone 5. Numeral 7 an orbit ring which is engaged in frictional engagement with the frictional transmission surface $5c$ of the planetary cone 5 and, in its nonrotation state, guides rotation of the planetary cone 5 about the axial center of the input shaft 2, i.e., the revolution. The frictional transmission surface $5b$ of the planetary cone 5 is engaged in frictional engagement with outer circumferential edge of the input transmission member 3. The cam force of the cam device 4 acting to move the input transmission member 3 in the axial direction acts as the pressure in the normal direction of the frictional transmission surfaces 5a, 5b, 5c of the planetary cone 5, and its acting direction and amount are set so as to provide a vector balance with the reaction applied to the shifting ring 6, the input transmission member 3 and the orbit ring 7, respectively. Numeral 8 designates an accessory drive pulley, numeral 8a a plurality of grooves on inner circumferential surface of the pulley 8 in the axial direction, and numeral 9 a roller key engaged with the grooves 8a for transmitting the rotational force of the shifting ring 6 to the pulley 8 and allowing the movement of the gear shifting ring 6 in the axial direction. Numerals 10, 11 designate side plates mounted on both ends of the pulley 8, and the pulley 8 is supported through the side plates 10, 11 and rotatable with respect to the input shaft 2.

Figure 2:
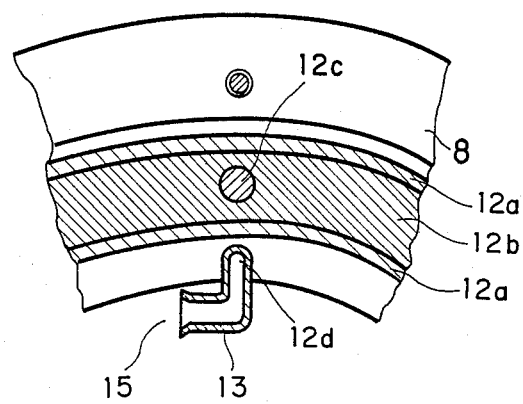
FIG. 2 is a sectional view taken along line II—II of FIG. 1.

In the embodiment, a transmission actuator to move the shifting ring 6 in the axial direction comprises a hydraulic piston/cylinder assembly 12 constituted to push the shifting ring 6 in the axial direction. The piston/cylinder assembly 12 is provided with a cylinder 12a integral with the side plate 10, a ring-like piston 12b, a plurality of rods 12c fixed to the piston ring 12b and abutting on the shifting ring 6, and a flow path 12d to guide the acting hydraulic pressure. Numeral 13 designates a Pitot tube which communicates with the flow path 12d and has other end opened forward in the rotational direction of the side plate 10 as shown in FIG. 2. Numeral 14 designates a return spring. The closed space surrounded by the pulley 8, the two side plates 10 and 11, the orbit ring 7 and the input shaft 2 is filled with a frictional transmission oil 15 as medium for the frictional transmission.

Numeral 16 designates a stationary member fixed to an engine (not shown), and a support 17 of generally cylindrical shape is rotatably supported by the stationary member 16 and arranged in coaxial relation to the crank shaft 1, and the crank shaft 1 passes through the central hole of the support shaft 17. The support shaft 17 extends inward into the side plate 11, and fixedly supports the orbit ring 7 at one end thereof. A one-way clutch 18 is installed between the stationary member 16 and the support shaft 17, and allows the support shaft 17 and the orbit ring 7 supported thereon to rotate with respect to the stationary member 16 only in the same direction as that of the crank shaft 1. Since the specific structure of the one-way clutch 17 is well known in this technical field, the detailed description shall be omitted here.

Operation of the embodiment in the above constitution will be described. The driving force of the input shaft 1 is transmitted through the cam device 4 to the input transmission member 3, thereby the planetary cone 5 rotates on its own axial center, and at the same time performs the revolution around the axial center of the input shaft 2 along the frictional transmission surface 5c with the orbit ring 7 being the stationary element. The shifting ring 6 engaged in frictional engagement with the frictional transmission surface 5a of the planetary cone 5 is rotated around the axial center of the input shaft 2 at the speed determined on the basis of the differential action between the self-rotation and the revolution of the planetary cone 5 and the transmission radius ratio, and drives the pulley 8 through the roller key 9. The rotational speed ratio between the input shaft 2 and the shifting ring 6 can be arbitrarily set by moving the shifting ring 6 in the axial direction so that the effective radius ratio of the frictional transmission between the input shaft 1 and the shifting ring 6 becomes a prescribed value.

Figure 3:
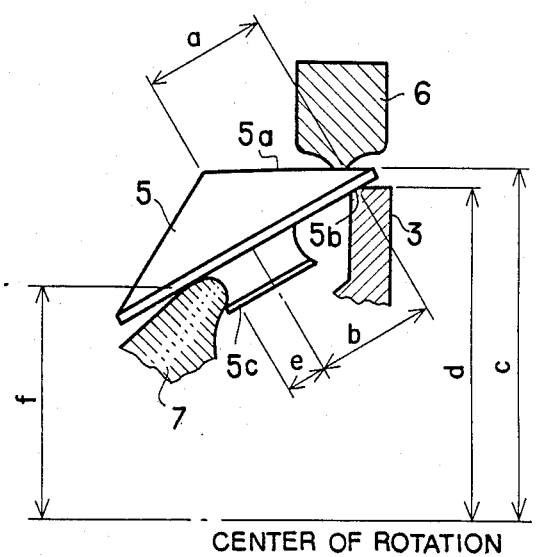
FIG. 3 shows a planetary cone and a member contacting therewith in the drive device shown in FIG. 1 illustrating contacting point and relative dimension.

FIG. 3 illustrates the effective radius a-f of each element of the transmission system in the drive device shown in FIG. 1. Assuming the rotational speed of the input shaft 1 be $N_1$ and rotational speed of the gear shifting ring 6 be $N_2$, it follows that $$N_2/N_1 = \frac{d(ec + fa)}{c(ed + fb)}$$

If the value of a is varied, $N_2/N_1$, i.e., ratio of the rotational speed of the pulley 8 to that of the input shaft 2, can be arbitrarily varied.

Effective radius a-f is as follows:
a: effective radius of the frictional transmission surface 5a of the planetary cone 5 to the shifting ring 6.
b: effective radius of the frictional transmission surface 5b of the planetary cone 5 to the input transmission member 3.
c: inner radius of the shifting ring 6.
d: effective radius of the input transmission member 3.
e: effective radius of the frictional transmission surface 5c of the planetary cone 5 to the orbit ring 7.
f: effective radius of the orbit ring 7.

Figure 4:
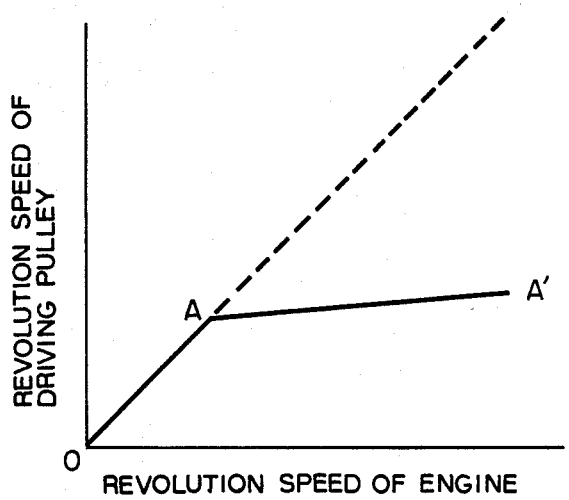
FIG. 4 is a graph illustrating rotational speed of an accessory drive pulley versus rotational speed of an engine.

The position of the shifting ring 6 in the axial direction is controlled by the hydraulic cylinder 12 as hereinafter described. Since the Pitot tube 13 rotates integrally with the side plate 10, the frictional transmission oil 15 is received at the opening of the Pitot tube 13 and thereby pump action is effected to introduce the hydraulic pressure through the flow path 12d to the hydraulic cylinder 12. The hydraulic pressure generated then an amount proportional to square of the relative rotational speed between the Pitot tube 13 and the frictional transmission oil 15. On the other hand, since the rotational speed of the Pitot tube 13 is equal to that of the pulley 8, output of the hydraulic cylinder 12 varies depending on the rotational speed of the pulley 8. For example, when the input of the hydraulic cylinder 12 increases, the shifting ring 6 is pushed towards the cone vertex of the planetary cone 5. As a result, speed of the pulley 8 is reduced and the hydraulic pressure from the Pitot tube 13 is reduced and output of the hydraulic cylinder is decreased by receiving a negative feedback. In the reverse operation, a positive feedback is added. Accordingly, since the output of the hydraulic cylinder 12 continuously controls the axial position of the shifting ring 6 in equilibrium to the reaction of the return spring 14, the rotational speed of the pulley 8 can be made approximately constant regardless of variation in the rotational speed of the input shaft 2. In FIG. 4 illustrating an example of the rotational speed control characteristics, the abscissa represents the engine rotational speed and the ordinate represents the accessory drive pulley rotational speed in the accessory drive device of the invention. In the region shown by line OA of FIG. 4, the rotational speed of the engine, i.e., the input shaft 1 is low and also the rotational speed of the pulley 8 is low and the output of the hydraulic cylinder 12 is low, thereby when the shifting ring 6 is pushed away from the cone vertex of the planetary cone 5 by the load of the return spring 14, the pulley 8 has the same rotational speed as that of the engine. In the region shown by line AA' of FIG. 4, output of the hydraulic cylinder 12 is in equilibrium to the reaction of the return spring 14, and even if the engine rotational speed rises the rotational speed of the pulley 8 is controlled to remain approximately constant. In addition, the pulley 8 may be constituted by another transmission output member such as a sprocket or a gear.

On the other hand, in case the frictional transmission surface sticks due to fault such as seizure, the rotational force of the input shaft 2 is directly transmitted to the pulley 8 at the same speed and the same rotational direction, and the orbit ring 7 and the support shaft 17 also receive the same rotational force as that of the input shaft 2. Since the rotational direction is the coupling release direction of the one-way clutch 18, the rotation is not constrained by the engine stationary member 16 and the operation can be continued without breaking any part of the device. In this case, the transmission function to the pulley 8 is lost naturally. However, since the pulley 8 has the same speed as the engine rotational speed, the basic function of the device can be maintained.

The one-way clutch 18 in the invention may be any type such as roller type, ball type or sprag type, or otherwise may be combination of a gear and a ratchet.

Also the pulley 8 may be replaced by another transmission output member such as a sprocket wheel or a gear.

According to the invention as above described, since the nonstage transmission with the differential planetary mechanism of frictional transmission type and the transmission actuator comprising the hydraulic cylinder acting by the skimming action, and the hydraulic pressure of the Pitot tube acting in the frictional transmission oil infused within the transmission are constituted integrally in compact structure within the inner circumferential space of a usual crank pulley, the installation space required facilitates the replacement for the usual crank pulley, the frictional transmission is not accompanied with noise during running, the mechanism of the transmission actuator is simple and can be made at low cost, and the rotational speed of the accessory drive pulley can be controlled to remain approximately constant from an intermediate range of the engine rotational speed, thereby providing energy saving operation of the accessories and improving the fuel cost of engine and the power performance. Moreover, since the stationary element of the differential planetary mechanism is connected through the one-way clutch to the engine stationary member, in case the frictional transmission surface of the transmission sticks due to fault such as seizure, the device is not broken but the basic function of the device can be maintained with safety.

What is claimed is:

1. A device for driving accessories such as an alternator, a cooling water pump, an air-conditioning compressor or the like, utilizing power taken from an output shaft of an engine, said device comprising:

an input shaft pivotally supported to a stationary element and receiving output from said output shaft and rotated at the rotational speed corresponding to that of said output shaft;

a transmission output member rotatably supported on said input shaft for transmitting the power to said accessory;

a planetary cone which can rotate on said input shaft in the revolution around the axial center of the input shaft and in the rotation around the axial center inclined with respect to said axial center of the input shaft, said planetary cone having a first part of nearly conical shape, and a second part of nearly cylindrical shape leading to a bottom surface of the first part, and first, second and third frictional transmission surfaces being formed on the conical surface of the first part, the bottom periphery of the first part and the circumferential surface of the second part, respectively;

an input transmission member installed rotatable with said input shaft and engaged at outer periphery of frictional engagement with the second frictional transmission surface of said planetary cone;

a support shaft of nearly cylindrical shape having a center hole through which said input shaft passes and arranged on coaxial relation to said input shaft and supported rotatably with respect to said stationary member;

a one-way clutch installed between said stationary member and said support shaft for allowing said support shaft to rotate only in the rotational direction of said output shaft;

an orbit ring fixedly supported by said support shaft, said orbit ring extending along the revolution path of said planetary cone and having an annular frictional engaging surface to be engaged in frictional engagement with the third frictional transmission surface of said planetary cone;

a shifting ring supported on said transmission output member and movable only in the axial direction thereof and having a frictional engaging surface engaged in frictional engagement with the first frictional transmission surface of said planetary cone always within the movable region in the axial direction; and a transmission ratio varying member for varying the position of said shifting ring in a direction toward or away from the rotation center of said planetary cone using the rotational speed of said transmission output member as a parameter and suppressing the rise of the rotational speed of said transmission output member in the range of the rotational speed of said input shaft larger than a prescribed value.

2. A device as set forth in claim 1, wherein said transmission ratio varying means is a hydraulic piston/cylinder assembly for varying the position of said shifting ring corresponding to the rotational speed of said transmission output member.

3. A device as set forth in claim 2, and further including a Pitot tube connected to said piston/cylinder assembly and wherein said input shaft, said transmission output member and said orbit ring constitute an annular closed space and said planetary cone, said input transmission member, said shifting ring, said hydraulic piston/cylinder assembly and said Pitot tube are enclosed in said space, and the space between these various members is filled with a frictional transmission oil.

4. A device as set forth in claim 3, wherein a working fluid to supply said hydraulic cylinder with hydraulic pressure by action of said Pitot tube is said frictional transmission oil.

5. A device as set forth in claim 1, wherein said shifting ring is guided along a plurality of key grooves formed on inner circumferential surface of said transmission output member and extending along the axial direction thereof.

6. A device as set forth in claim 1, wherein said transmission output member is a pulley.

* * * * *